Figure 1:
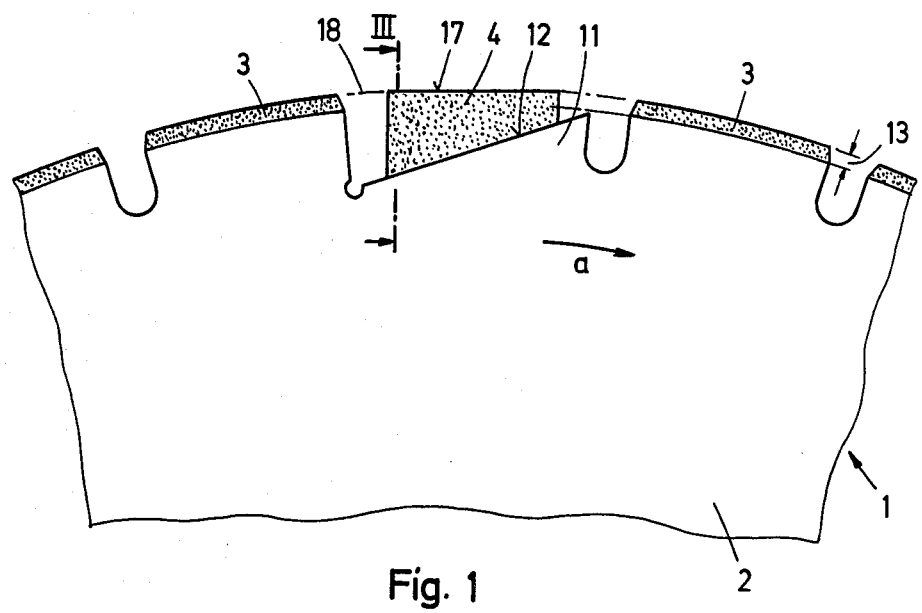

United States Patent [19]

Eichenlaub et al.

[11] 4,291,667
[45] Sep. 29, 1981

[54] CUTTING WHEEL

[76] Inventors: Rolf Eichenlaub, Quellenweg 26, D-5900 Siegen-Volnsberg; Boris Z. Novakovic, Am Homberg 28, D-5902 Netphen 2-Frohnhausen, both of Fed. Rep. of Germany

[21] Appl. No.: 102,414

[22] Filed: Dec. 11, 1979

[30] Foreign Application Priority Data

Dec. 13, 1978 [DE] Fed. Rep. of Germany ....... 2853650

[51] Int. Cl.³ .............................................. B28D 1/04
[52] U.S. Cl. ..................................... 125/15; 51/206 R
[58] Field of Search ......................... 125/15 R, 12, 13; 51/206 R, 73 R

[56] References Cited

U.S. PATENT DOCUMENTS

| 3,064,399 | 11/1962 | Anderson | 125/15 |
| 3,128,755 | 4/1964 | Benson | 125/15 |
| 3,162,187 | 12/1964 | Christensen | 125/15 |
| 3,299,579 | 1/1967 | Jacobson | 51/206 R |

FOREIGN PATENT DOCUMENTS

| 1917957 | 10/1970 | Fed. Rep. of Germany | 125/15 |
| 2318378 | 9/1974 | Fed. Rep. of Germany | 125/15 |
| 265789 | 1/1971 | U.S.S.R. | 125/15 |

Primary Examiner—Harold D. Whitehead
Attorney, Agent, or Firm—Young & Thompson

[57] ABSTRACT

A cutting wheel for natural and artificial rock, such as road surfaces of asphalt or concrete, comprises a carrier disk with cutting segments in a regular series around the circumference of the carrier disk. The series is interrupted at spaced intervals, by at least two extra segments which are made of a material harder than that of the cutting segments and are preferably clad with diamond abrasive material. The extra segments are quadrilateral and have their radially inner edge inclined upwardly in the direction of rotation of the cutting wheel. The correspondingly upwardly inclined portion of the cutter wheel provides a base to which the extra segment is soldered. The extra segments have the same width as the cutting segments, which width is greater than the thickness of the body of the cutting wheel.

10 Claims, 5 Drawing Figures

U.S. Patent  Sep. 29, 1981  Sheet 2 of 2  4,291,667
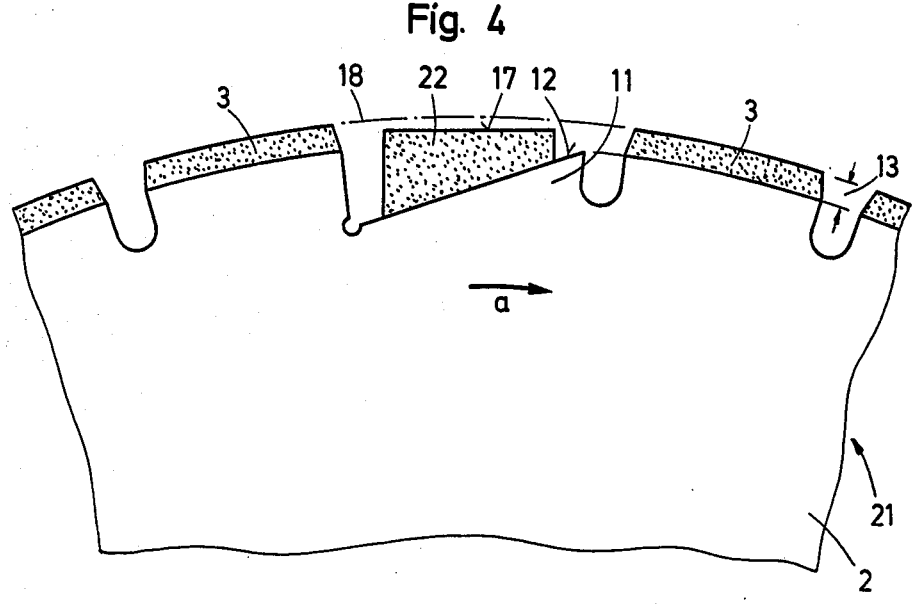
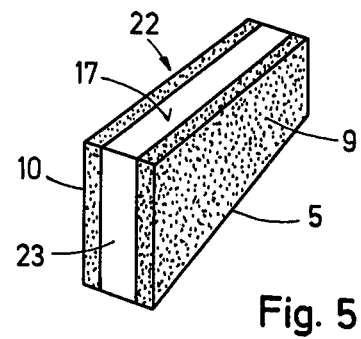

CUTTING WHEEL

The invention relates to a cutting wheel for natural and artificial rock material, especially road surfaces of asphalt or concrete, with a carrier disk, cutting segments being arranged on the circumference of this carrier disk.

Cutting wheels of this type, the cutting segments of which are sintered from a metallic powder with a diamond additive and are soldered to the carrier disk of a special steel, are utilized preferably for cutting apart road surfaces of asphalt or concrete in the excavation of ditches for the laying of conduits, as well as for the provision of pressure expansion joints, cross expansion joints, and longitudinal expansion joints in roadway surfaces for the prevention of random crack formations. Such cutting wheels are subject to great wear and tear, caused by the strongly abrasive additives in the road surface, such as quartz, gravel, and the like, by an inadequate mud removal, as well as by the rough operation during which extensive oscillations can occur in the cutting wheel; consequently, these cutting wheels exhibit relatively low cutting performance.

The invention is based on the object of developing a cutting wheel distinguished by a high cutting performance due to an increase in the service life.

Starting with a cutting wheel of the type described hereinabove, this object has been attained by providing that the carrier disk exhibits at least two extra segments arranged at a spacing along the circumference, made of a material which is harder than that of the cutting segments.

In a further development of the invention, the extra segment is fashioned as a sandwich element having the shape of a rectangular plate with a beveled, lower narrow side, and the sandwich element has a core layer of metal, the two broad sides of this layer being covered by respectively one outer layer of a diamond material.

To additionally improve the extra segment, another measure is a contributing factor, namely to cover the upper narrow side of the core layer additionally with an outer layer.

Another embodiment of the extra segment is characterized in that all outer surfaces of the core layer of the segment are covered by a continuous outer layer of a diamond material.

The extra segment is suitably sintered and pressed from a pulverulent material.

The invention is decisively improved by mounting the extra segment with the lower, beveled narrow side to a base formed on the circumference of the carrier disk with a corresponding counter bevel, and by providing that the counter bevel ascends in the direction of rotation of the carrier disk.

The lower narrow side of the core layer of the extra segment is suitably soldered to the base of the carrier disk.

Two embodiments of the cutting wheel of this invention are advantageously utilized, wherein the upper narrow side of the extra segments, in the first embodiment, extends at the level of the outer circumference and, in the second embodiment, extends below the outer circumference of the cutting segments.

The cutting wheel of this invention is distinguished in that the extra segments distributed in a low number along the circumference offer an effective protection against a premature lateral wear of the carrier disk and an ensuing violent detachment of the cutting segments before these are worn; and in that the extra segments substantially increase the cutting performance of the cutting wheel as compared to the conventional cutting wheels, primarily due to their protective effect and in the second place by their high cutting efficiency.

Figure 2:
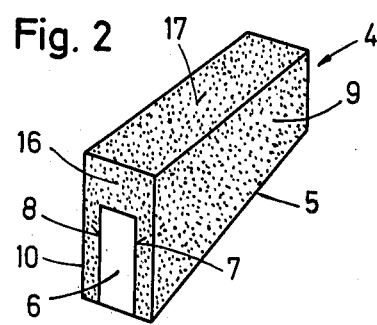
Figure 3:
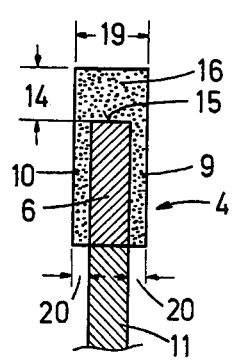

The invention will be explained in detail below with reference to embodiments illustrated in the drawings wherein:

FIG. 1 shows a fragmentary lateral view of a first embodiment of the cutting wheel according to the invention, FIG. 2 shows a perspective view of the first embodiment of an extra segment utilized in the cutting wheel of FIG. 1, on an enlarged scale, FIG. 3 shows a section along line III—III of FIG. 1, FIG. 4 shows a lateral, fragmentary view of a second embodiment of the novel cutting wheel, and FIG. 5 is a perspective view of a second embodiment of the extra segment utilized in the cutting wheel of FIG. 4, on an enlarged scale.

The cutting wheel 1 according to FIG. 1 comprises a carrier disk 2 made of a special steel; on the circumference of this carier disk, there are arranged cutting segments 3 and four extra segments 4 at 90° spacings. The cutting segments 3 have the shape of an annular segment; they are sintered from a metallic powder on a tungsten-cobalt basis with a diamond additive and are hard-soldered onto the circumference of the cutting wheel 1 with silver solder.

The extra segment 4 is constructed as a sandwich element having the shape of a rectangular plate with a beveled, lower narrow side 5 and exhibits a core layer 6 of metal, the two broad sides 7, 8 of this layer being covered by respectively one outer layer 9, 10 of a diamond material. The core layer 6 consists of a metallic powder of a tungsten-cobalt basis and is combined with the two outer layers 9, 10 of diamond by sintering and pressing.

The extra segment 4 is hard-soldered with silver solder, with its lower, beveled narrow side 5, in the region of the core layer 6 to a base 11 having a corresponding counter bevel 12 and formed on the circumference of the carrier disk 2. The direction of rotation a of the cutting wheel 1 is chosen so that the counter bevel 12 of the base 11 ascends in the direction of rotation. By the wedge effect of the counter bevel 12, the objective is attained that the cut-apart concrete or asphalt of the road surface is quickly conveyed to the outside after severing the surface so that wear due to the strongly abrasive materials, such as quartz and gravel, is substantially mitigated. The extra segments 4 offer effective protection against premature wear of the carrier disk 2, so that the cutting height 13, 14 of the cutting segments 3 and of the extra segments 4 can be fully exploited.

The upper narrow side 15 of the core layer 6 pertaining to the extra segment 4 utilized at the cutting wheel 1 is additionally coated with an outer layer 16.

In the embodiment of the cutting wheel according to FIG. 1, the upper narrow side 17 of the extra segments 4 extends at the level of the outer circumference 18 of the cutting segments 3.

The cutting thickness 19 of the cutting segments 3 and of the extra segments 4 is of equal size, and both segments 3, 4 project laterally by a distance 20 beyond the carrier disk 2.

In the cutting wheel embodiment 21 according to FIG. 4, three extra segments 22 of the construction shown in FIG. 5 are arranged along the circumference of the carrier disk 2 in addition to the customary cutting segments 3. The upper narrow side 17 of the three extra segments 22 extends, in the embodiment of the cutting wheel 21, below the outer circumference 18 of the cutting segments 3. In case of the extra segment 22 of FIG. 5, the core 23 is fashioned as a solid layer extending from the beveled, lower narrow side 5 continuously up to the upper narrow side 17.

In a deviation from the above-described embodiments, it is possible to arrange, along the circumference of the cutting wheels, two extra segments, or more than four extra segments. Furthermore, all outer sufaces of the core layer of the extra segment can be covered throughout with an outer layer of a diamond material.

What is claimed is:

1. Cutting wheel for natural and artificial rock material, especially road surfaces of asphalt or concrete, comprising a carrier disk, cutting segments on the circumference of said carrier disk, and at least two extra segments spaced apart along the circumference of the carrier disk and made of a material harder than that of the normal cutting segments, each said extra segment being constructed with a beveled, lower narrow side by which it is attached to a base formed on the circumference of the carrier disk and having a corresponding counter bevel ascending in the direction of rotation of the carrier disk, the beveled narrow side of the extra segments projecting from both side faces of the base.

2. Cutting wheel according to claim 1, in which each said extra segment is a sandwich element having a core layer of a metal, the two broad sides of said core layer being covered each by an outer layer of an abrasive material.

3. Cutting wheel according to claim 2, in which the upper narrow side of the core layer is also coated with an outer layer of an abrasive material.

4. Cutting wheel according to claim 1, in which said extra segments are sintered and pressed from pulverulent materials.

5. Cutting wheel according to claim 1, in which said lower narrow side of the extra segment is soldered to said base of the carrier disk in the zone of the core layer.

6. Cutting wheel according to claim 1, in which the upper narrow side of the extra segments is disposed at the level of the outer circumference of the normal cutting segments.

7. Cutting wheel according to claim 1, in which the upper narrow side of the extra segments is disposed below the outer circumference of the normal cutting segments.

8. Cutting wheel according to claim 1, in which said material harder than the cutting segments is an abrasive material.

9. Cutting wheel according to claim 8, in which said abrasive material is a diamond material.

10. Cutting wheel according to claim 2, in which said core layer is of substantially the same thickness as said base and substantially only said outer layers project from the side faces of the base.

* * * * *